United States Patent [19]

Schöldström et al.

[11] 4,025,192

[45] May 24, 1977

[54] OPTICAL MEASURING METHOD

[75] Inventors: Karl Ragnar Schöldström; Holger Marcus; Lennart Nordström, all of Lidingo; Nils Ståhl, Borlange, all of Sweden

[73] Assignee: AGA Aktiebolag, Lidingo, Sweden

[22] Filed: Nov. 25, 1975

[21] Appl. No.: 635,082

[52] U.S. Cl. .................................. 356/152; 356/5; 356/108; 356/141

[51] Int. Cl.² .................................. G01B 11/26

[58] Field of Search .................. 356/5, 141, 152, 2, 356/108; 250/262; 33/277

[56] References Cited

UNITED STATES PATENTS

| | | | |
|---|---|---|---|
| 3,352,223 | 11/1967 | Garra | 356/4 |
| 3,653,769 | 4/1972 | Albright | 356/141 |
| 3,809,477 | 5/1974 | Russell | 356/5 |
| 3,832,056 | 8/1974 | Shipp et al. | 356/5 |
| 3,866,229 | 2/1975 | Hammack | 356/141 |
| 3,898,445 | 8/1975 | MacLeod et al. | 356/141 |

OTHER PUBLICATIONS

Loney, *The Elements of Coordinate Geometry*, 1920, pp. 10–11, Sci. Lib.

*Primary Examiner*—Maynard R. Wilbur
*Assistant Examiner*—S. C. Buczinski
*Attorney, Agent, or Firm*—Lerner, David, Littenberg & Samuel

[57] ABSTRACT

A method of measuring changes in the location of a physically inaccessible point on a surface is disclosed in which the surface may be moved relative to the measuring point between successive measurements.

5 Claims, 2 Drawing Figures

OPTICAL MEASURING METHOD

FIELD OF THE INVENTION

This invention relates to distance measuring methods and particularly to distance measuring methods employing electro-optical equipment.

BACKGROUND OF THE INVENTION

In the manufacture of steel, furnaces are often lined with refractory material. This refractory material wears as a result of the process. After the refractory material has worn down to a predetermined level, it must be replaced, otherwise a dangerous situation may arise wherein the molten steel will leak from the furnace. Steel making equipment is quite expensive and the economic efficiency of such equipment is dependent upon the length of time a furnace can be employed without shutting down for providing a new refractory lining. Therefore, it is of substantial economic significance to employ a refractory lining as long as possible, yet it is also important not to allow the lining to be used when it has worn below a safe minimum thickness.

Presently, several methods are employed for monitoring the thickness of refractory linings in steel making equipment.

One of the methods that has been employed is stereophotography which utilizes changes in parallax between a series of photographs to determine the dimension and changes of dimension in a furnace, mine or other object. A careful and time consuming comparison of photographic images makes the stereo method a cumbersome and expensive process control. In addition, an accuracy of only between 30 to 40 millimeters is achieved.

Another prior art method comprises the embedding into the furnace lining precise deposits of radioisotopes which have predetermined concentration and composition characteristics. The radioisotopes characteristics vary as a function of the distance from an original surface, which during erosion recedes releasing a predetermined concentration of radioisotopes. Appropriate monitoring equipment detect the erosion of the surface. The disadvantages of the isotope method include limited applicability to a specific area or areas. Hopefully, these areas are representative of the erosion of the entire surface to be monitored. In order to alleviate the abovedescribed disadvantages, a great number of unique isotope characteristics must be employed on a great number of different portions of a surface which may provide a variety of indications which due to their complexity may even have a tendency to mask the true erosion of the entire surface. However, if the area is small only a single or limited measurement sample is obtained which usually is not representative of the entire surface. In addition, the measuring time is prohibitively long and expensive since elaborate isotope measuring and evaluation techniques are required. Therefore, the isotope method would only be useful as an aid in checking and calibrating other methods. Sonic methods usually are precluded because of thermal gradients and high refractions in the atmosphere.

Distance measuring equipment such as electro-optical type would be ideally suited for measuring thickness in a furnace since one can do that from a distance. However, Furnaces are moved during their usage and it would be impossible to maintain a constant relationship between the electro-optical distance measuring equipment and the furnace and, further, since the interior of the furnace is at an extremely high temperature level, it would be difficult, if not impossible, to site the electro-optical distance measuring equipment on a particular joint for separate readings.

SUMMARY OF THE INVENTION

In order to overcome the problems of the prior art, the present invention provides a method of making a series of measurements of the intersection of a line transverse to a surface, the surface being subject to wear and the surface as it wears in which the object may move with respect to a measuring instrument between measurements which includes the steps of measuring the location of first, second and third non-collinear reference points on the object with reference to the measuring instrument with the object in a first location; measuring the location of a first intersection of the line and the surface with respect to the measuring instrument with the object in the first location, measuring the location of the first, second and third non-collinear reference points on the object with respect to said measuring instrument with said object in a second location, locating an intersection of the line and the surface with respect to the measuring instrument with the object in the second location, and measuring the distance thereof from the measuring instrument.

As one embodiment of the invention, the intersection in the second location is determined by determining the relationship of the measuring instrument to the three non-collinear reference points adding the information relating the original intersection to the three non-collinear reference points and adding a factor based upon estimated wear.

In accordance with the further aspect of this embodiment of the invention, the new intersection is determined by an iterative process of estimating where the intersection should occur and measuring to see if a surface exists at the point.

DETAILED DESCRIPTION OF THE INVENTION

Figure 1:
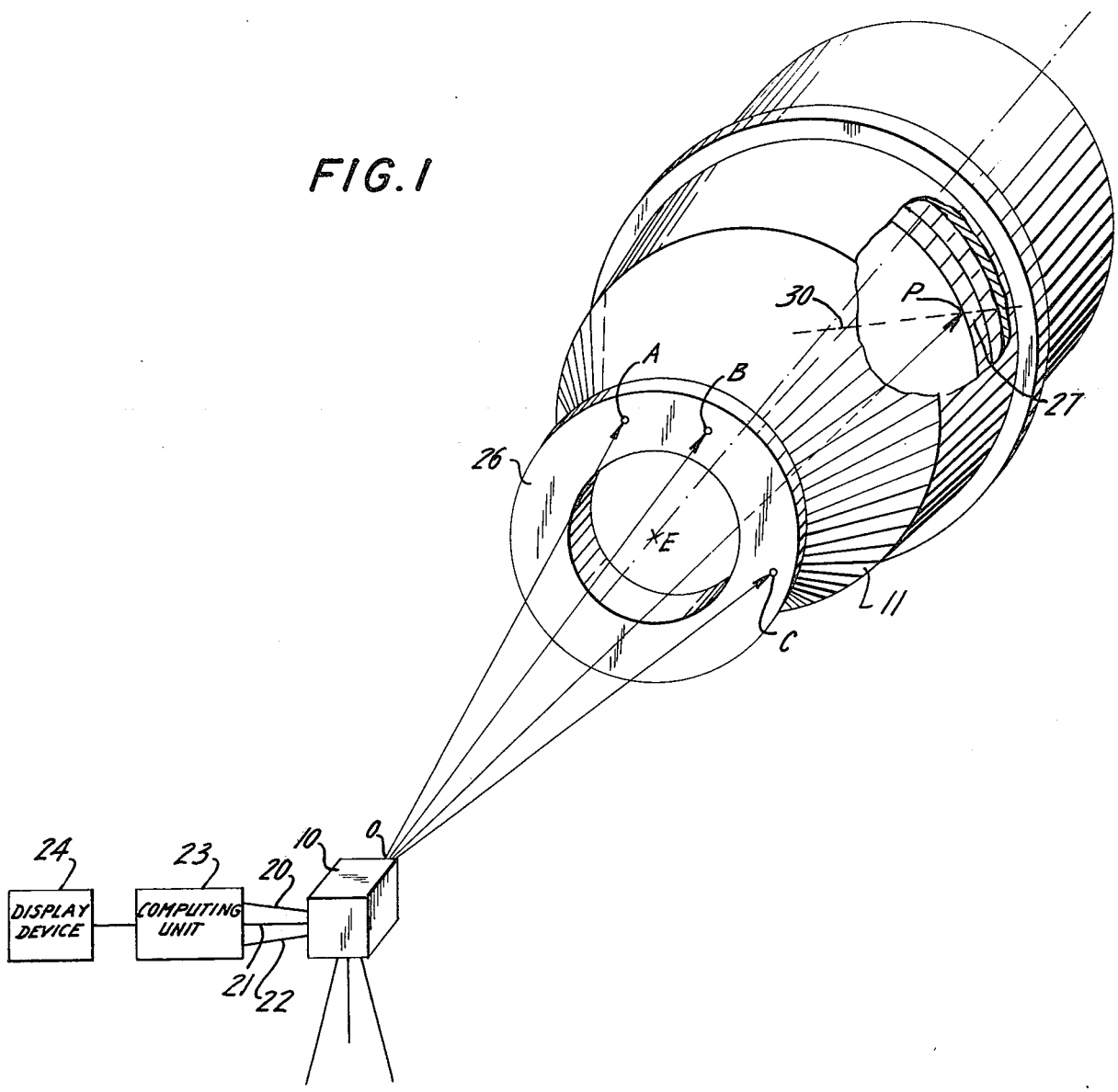
FIG. 1 is a perspective drawing of a distance and angle measuring instrument making measurements on a furnace in accordance with the teachings of the present invention.

Referring now to FIG. 1, we see an electro-optical distance measuring instrument 10 such as an AGA GEODIMETER, Model 700 made by AGA Aktiebolag, Lidingo, Sweden, modified in accordance with the teachings of co-pending U.S. application filed simultaneously herewith entitled "APPARATUS FOR MEASURING THE DISTANCE TO A POINT ON THE INNER WALL OF A HOT FURNACE" Invented by Ragnar Scholdstrom et al, which measures distances and horizontal and vertical angles from the instrument. The instrument provides signals on the leads 20, 21 and 22 indicative of the various angles and distances measured. These signals are applied to a computing unit 23 which has a display unit 24 associated therewith.

The instrument 10 is mounted in front of a furnace 11 which is mounted for pivotal movement by a support structure not shown.

In accordance with this invention, three non-collinear points $a$, $b$ and $c$ are physically marked on a front surface 26 of the furnace, preferably on a circle perpendicular to an axis of the furnace, with the relationship of the points to the furnace not significantly changing with time.

In accordance with this invention, the thickness of a refractory lining 27 is monitored by making an initial measurement of the position of that lining with regard to a coordinate system associated with the furnace and a comparison with its drawing and then making further measurements of the position of the lining 27 relative thereto and comparing the same with the initial measurement. Since the furnace 11 may move relative to the instrument 10 between successive measurements, it is necessary to be able to relate the coordinate system of the furnace 11 with a coordinate system relative to the measuring instrument 10.

In accordance with this invention, the three non-collinear points $a$, $b$ and $c$ are employed in a coordinate conversion technique to relate the coordinates of the furnace 11 no matter what its orientation to the coordinates of the measuring instrument 10.

In one embodiment of this invention, the computing unit 23 is a small general purpose digital computation unit programmed to store signals from distance measuring instrument 10 while the furnace 11 is in a first position. An operator of the distance measuring instrument 10 measures the points $a$, $b$ and $c$ and the distance and angular relationship thereof is stored in the memory of the computing unit 23. A point P on the surface of the lining 27 is then measured and the distance and angular relationship thereof to the distance measuring instrument 10 is also stored in the computing unit 23. The point P is the intersection of the surface 27 with a line 30 transverse thereto.

After the furnace is used for steel processing, the lining 27 is worn and accordingly the location of the surface is changed. Additionally, the furnace is now in a different position relative to the measuring instrument.

In order to measure the new location of the surface of the lining 27, an operator of the measuring instrument 10 measures the location of the three collinear points $a$, $b$ and $c$ with respect to the measuring instrument 10. Signals indicative of these measurements are provided by the measuring instrument 10 to the computing unit 23. The computing unit 23 by means of the program entered therein employs data from the furnace drawing or results from the first measurement to establish origin coordinates for the instrument 10 relative to the furnace 11. The computing unit 23 then displays aiming angles to be used to relocate the wanted position on the surface of the lining 27 in terms of the coordinate system of the furnace 11. The computing unit 23 next employs the second measurements of the three non-collinear points $a$, $b$ and $c$ to establish the coordinate system of the furnace 11 in terms of its new orientation to the measuring instrument 10. With this information, the computing unit next determines the coordinates of the point P in terms of the present location of the furnace 11 in relationship to the measuring instrument 10. The computing unit 23 also adds an estimated distance along line 30 from the location of the point p based upon the expected wear of the lining 27 to locate where the surface to be measured should be presently located if the estimated wear is correct. The operator of the measuring instrument 10 next points the measuring instrument 10 in the direction indicated by these calculations and measures to see if a surface is measured at the distance determined. If a surface, in fact, exists at the predetermined distance, then the estimated wear is, in fact, the actual wear. If the distance measured is not the predetermined distance but is greater or smaller than the predetermined distance then the estimated wear is changed accordingly with a new estimate, the computer 23 recalculates the angle at which measurement should be made and the distance to be measured and a new reading is taken with unit 10. If this action is repeated, iteratively, until the estimated wear chosen produces the predetermined distance an accurate reading is thus achieved of the wear of the lining.

The program employed in the calculating unit 23 utilizes coordinate conversion techniques based upon vector notation. The unit employs the three reference points $a$, $b$ and $c$ measured by the instrument 10 in polar coordinates with the instrument as its origin to a cartesian coordinate system with the instrument 10 still as its origin. The coordinate system of the blast furnace 11 is derived by manipulation of vector values relating to the relative positions of the instrument 10 and the reference points $a$, $b$ and $c$.

Figure 2:
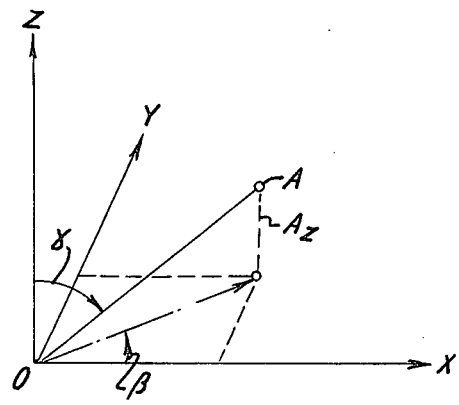
FIG. 2 is a graphical showing of a pair of coordinate systems each of which has the electro-optical measuring system as its origin in accordance with the teachings of the present invention.

To begin the transformation, vector quantities are generated in the cartesian coordinate system with the instrument as its origin for each of the points $a$, $b$ and $c$. Thus we have for the origin vector $\overline{A}(A_x, A_y, A_z)$.

$$A_x = D_A \cdot \sin\gamma_A \cdot \cos\beta_A \tag{1}$$

$$A_y = D_A \cdot \sin\gamma_A \cdot \sin\beta_A \tag{2}$$

$$A_z = D_A \cdot \cos\gamma_A \tag{3}$$

and equivalent expressions for $\overline{B}(B_x, B_y, B_z)$ and $\overline{C}(C_x, C_y, C_z)$. (See FIG. 2)

From these origin vectors two vectors in the plane of ABC are derived.

$$\overline{U} = \overline{B} - \overline{A} = (B_x - A_x, B_y - A_y, B_z - A_z) \tag{4}$$

$$\overline{V} = \overline{C} - \overline{B} = (C_x - B_x, C_y - B_y, C_z - B_z) \tag{5}$$

The vector $\overline{N}$ of the central axis, which is perpendicular to the plane ABC, can now be calculated by vectorial multiplication of $\overline{U}$ and $\overline{V}$.

$$\overline{N} = \overline{U} \times \overline{V} \tag{6}$$

or in detail $$N_x = U_y \cdot V_z - U_z \cdot V_y \tag{7}$$

$$N_y = U_z \cdot V_x - U_x \cdot V_z \tag{8}$$

$$N_z = U_x \cdot V_y - U_y \cdot V_x \tag{9}$$

For later simplification it is practical to use $\overline{N}$ in a normalized form with unit length.

$$\hat{n} = \left( \frac{N_x}{|N|}, \frac{N_y}{|N|}, \frac{N_z}{|N|} \right) \tag{10}$$

By establishing the coordinates of one point on the central axis an expression of this axis in parametric notation can be made. If two of the points AB, BC or AC can be chosen to constitute a symmetrical diameter, then their midpoint E is on the axis. If two of the A and C are on the diameter of a circle $$\overline{E} = (\overline{A} + \overline{C})/2 \tag{11}$$

or in detail $$E_x = (A_x + C_x)/2 \tag{12}$$

$$E_y = (A_y + C_y)/2 \tag{13}$$

$$E_z = (A_z + C_z)/2 \tag{14}$$

In practical application, however, it may not be possible to use two points constituting a diameter and in these usual cases it is necessary to use more complicated algebra. In either event point E on the axis is, since ABC is a circle, defined as the crossing of the midpoint perpendiculars $\overline{S}$ and $\overline{T}$ to the vectors $\overline{U}$ and $\overline{V}$, which is contained in the common plane of $\overline{U}$ and $\overline{V}$. Since $\overline{S}$ is perpendicular to both $\overline{U}$ and $\overline{N}$ we can find the direction of $\overline{S}$ by vectorial multiplication.

$$\overline{S} = \overline{N} \times \overline{U} \tag{15}$$

and equivalent for $$\overline{T} = \overline{N} \times \overline{V} \tag{16}$$

The detailed expressions are found according to the rules given at (6), (7), (8) and (9).

The midpoint $M_1$ of $\overline{U}$ and $M_2$ of $\overline{V}$ are found according to rules given at (11), (12), (13) and (14).

$$\overline{M_1} = (\overline{A} + \overline{B})/2 = \left( \frac{A_x + B_x}{2}, \frac{A_y + B_y}{2}, \frac{A_z + B_z}{2} \right) \tag{17}$$

$$\overline{M_2} = (\overline{B} + \overline{C})/2 = \left( \frac{B_x + C_x}{2}, \frac{B_y + C_y}{2}, \frac{B_z + C_z}{2} \right) \tag{18}$$

The lines from $M_1$ to E and from $M_2$ to E can be expressed in parametric notation with p as the common parameter $$x_1 = M_{1x} + p_1 \cdot S_x \tag{19}$$

$$y_1 = M_{1y} + p_1 \cdot S_y \tag{20}$$

$$z_1 = M_{1z} + p_1 \cdot S_z \tag{21}$$

and $$x_2 = M_{2x} + p_2 \cdot T_x \tag{22}$$

$$y_2 = M_{2y} + p_2 \cdot T_y \tag{23}$$

$$z_2 = M_{2z} + p_2 \cdot T_z \tag{24}$$

At the crossing of these lines we have the center point E and here $x$ of (19) is equal to $x$ of (22) and equivalent for (20), (23) and (21), (24). From this we get for point E with parameters $p_{1E}$ and $p_{2E}$ at that point E.

$$M_{1x} + p_{1E} \cdot S_x = M_{2x} + p_{2E} \cdot T_x \tag{25}$$

$$M_{1y} + p_{1E} \cdot S_y = M_{2y} + p_{2E} \cdot T_y \tag{26}$$

By eliminating $p_{2E}$ we get $$p_{1E} = \frac{(M_{1y} - M_{2y}) \cdot T_x - (M_{1x} - M_{2x}) \cdot T_y}{S_x \cdot T_y - S_y \cdot T_x} \tag{27}$$

By putting the value of $p_{1E}$ into the equations (19), (20), (21) we get the origin vector of $\overline{E}(E_x, E_y, E_z)$. We can now write the expression of the central axis in parametric notation as $$x = E_x + t \cdot n_x \tag{28}$$

$$y = E_y + t \cdot n_y \tag{29}$$

$$z = E_z + t \cdot n_z \tag{30}$$

where $t$ constitutes a depth from the plane ABC.

We can also establish a reference for angular positions by taking, for example, the vector $\overline{A} - \overline{E}$ as a reference vector, which also preferably is taken in normalized format.

$$\hat{A} = \frac{\overline{A} - \overline{E}}{|\overline{A} - \overline{E}|} \tag{31}$$

similar to (10).

We have now established the mathematical reference system for cylindrical coordinates of a point anywhere, its depth $h$ by its projection on the line (28), (29), (30), its radial distance $r$ by the perpendicular distance to the same line, and its angular position $\alpha$ by comparing its perpendicular radius to the line with the reference direction of $\hat{a}$.

For the sake of completeness this is described in more detail.

After having aimed the beam at a point on the surface to be evaluated we get from the instrument the polar origin coordinates of the point $\overline{P}(P_x, P_y, P_z)$. These coordinates are transformed to cartesian coordinates according to (1), (2) and (3). From this we calculate the difference vector from the point E to P.

$$\overline{F} = \overline{P} - \overline{E} \tag{32}$$

By scalar multiplication of the $\overline{F}$ vector with the normalized $\hat{n}$ vector we get the depth $h$ of P.

$$h = \overline{F} \cdot \hat{n} = F_x \cdot n_x + F_y \cdot n_y + F_z \cdot n_z \tag{33}$$

By definition $h$ is identical to $t$ in (28), (29), (30) for the point G where the plane perpendicular to $\hat{n}$ and containing P intersects the line through E with the direction $\hat{n}$. We have therefore $$G_x = E_x + h \cdot n_x \tag{34}$$

$$G_y = E_y + h \cdot n_y \tag{35}$$

$$G_z = E_z + h \cdot n_z \tag{36}$$

The radius from the central axis to the point is calculated by $$r = [(P_x - G_x)^2 + (P_y - G_y)^2 + (P_z - G_z)^2]^{1/2} \tag{37}$$

To resolve the angular position of P we make further multiplications. We define an additional directional vector in the plane ABC by vectorial multiplications as $$\hat{b} = \hat{n} \times \hat{a} \tag{38}$$

We now normalize the vector $\bar{P} - \bar{G}$ (which follows the line 30 of FIG. 1) to $$\hat{p} = \frac{\bar{P} - \bar{G}}{|\bar{P} - \bar{G}|} \qquad (39)$$

With two scalar multiplications we get $$\hat{p} \cdot \hat{a} = \cos \alpha \qquad (40)$$

$$\hat{p} \cdot \hat{b} = \cos(90 - \alpha) = \sin \alpha \qquad (41)$$

From these values for $\cos \alpha$ and $\sin \alpha$ we can resolve $\alpha$.

If the cylindrical coordinates $h$, $r$ and $\alpha$ are unpractical for the purpose, it is easy to transform into cartesian coordinates along $\hat{n}$, $\hat{a}$ and $\hat{b}$.

When it is desired to point the beam to the prescribed area on the new surface the equations, e.g. (41), (40), (37), (36), (35), (34), (30), (29), (28), (3), (2), (1) are run in a reversed fashion with the added estimate of wear to find an azimuth angle $\beta$ and a zenith angle $\gamma$ for the requested point.

APPENDIX A

This appendix is a program listing in direct machine language for running on a Hewlett-Packard calculator No. 9810 which may serve as the computing unit 23.

PROGRAM LISTING

Program with distance checking

```
0:
TBL 3;0→R32;35→R
35;SFG 2;GSB 7 ⊢
1:
DSP "IMS 4";STP
;GTO 17 ⊢
2:
RED 3,C,X;IF C=0
;DSP "SLOPE";
STP; JNP 0 ⊢
3:
X/1E3→X;RED 1,C,
Y;Y/1E4→Y;RED 2,
C,Z;Z/1E4→Z ⊢
4:
IF FLG 2;PRT X,Y
,Z;SPC 1;R31+4→R
31 ⊢
5:
GSB 8 ⊢
6:
RET ⊢
7:
1→R31;R32+1→R32;
FXD 0;PRT "R",R3
2;SPC 1;FXD 3;
RET ⊢
8:
<X*SIN Z→C)*SIN
Y→RA;C*COS Y→R(A
+1);X*COS Z→R(A+
2);RET ⊢
9:
T(RC+2+R(C+1)↑2+
R(C+2)↑2)→Z;RET
⊢
10:

16:
RA*RB+R(A+1)*R(B
+1)+R(A+2)*R(B+2
)→Y;RET ⊢
17:
0→R28;FXD 4;EHT
"D,H",A;PRT A ⊢
18:
ENT "C.C",A;PRT
A;FXD 3;ENT "SC"
,R35;0→R30;0→R33
⊢
19:
SPC 1;CFG 13;
DSP R28+1;DSP ;
DSP ;ENT "ALPHA"
,A;IF FLG 13;
GTO 24 ⊢
20:
R28+1→R28;FXD 0;
PRT R28,A;FXD 2;
34+3*R28→C;A→RC ⊢
21:
ENT "DEPTH",A;A→
R(C+1);ENT "R−ES
T",B;PRT A,B;B÷R
(C+2);R31+5→R31 ⊢
22:
IF R31>50;GSB 7 ⊢
23:
GTO 19 ⊢
24:
ENT "REF ABC",A;
FXD 0;PRT A;ENT
"PHI/A",R30;FXD
3;ENT "DTH",R33;
PRT R30,R33,R35;

32:
9→A; 12→B;3→C;
GSB 10 ⊢
33:
0→A;→B;15→C;
GSB 11 ⊢
34:
15→A;0→B;18→C;
GSB 11 ⊢
35:
3→B;21→C;GSB 11 ⊢
36:
((R7−R13)*R21−(R
6−R12)*R22)/(R+8
*R22−R19*R21)→Z;
0→C ⊢
37:
(R(6+C)+R(9+C)+Z
*R(18+C))/2→R(18
+C);C+1→C ⊢
38:
IF C≤2;JMP −1 ⊢
39:
15→C;GSB 14 ⊢
40:
18→A;6→B→C;GSB 1
0 ⊢
41:
GSB 14 ⊢
42:
PRT Z;SPC 3;DSP
Z;STP ⊢
43:
GSB 7 ⊢
44:
DSP "BAD?GOTO 25
";STP ⊢
45:
15→A;6→B;21→C,
```

PROGRAM LISTING

Program with distance checking

RB −RA⟶RC;R(B+1)−R(A+1)⟶R(C+1);R(B+2)−R(A+2)⟶R(C+2);RET ⊢
11:
R(A+1)*R(B+2)−R(A+2)*R(B+1)⟶RC ⊢
12:
R(A+21*RB−RA*R(B+21⟶R(C+1) ⊢
13:
RA*R(B+1)−R(A÷1)*R8⟶R(C+2);RET ⊢
14:
GSB 9 ⊢
15:
RD/Z÷RD;R(D+1)/Z⟶R(C+1);R;D+2)/Z R(D+2);RET H

50:
34+3*R29⟶C; (RC−R30)/.9⟶A; (R24*COS A−R25*SIN H)*R17/(R26*R24−R27*R25)⟶Z ⊢
51:
Z⟶R21;(R17*COS H−R26*R21)/R25⟶R22;−(R15*R21+R16*R22)/R17⟶R23 ⊢
52:
R(C+1)−R33⟶R0 ⊢
53:
R(C+2)⟶R1 ⊢
54:
R18+R0*R15+R1*R21⟶R9;R19+R0*R16+R1*R22⟶R10 ⊢
55:
R20+R0*R17+R1*R23⟶R11 ⊢
56:
ATN (R9/R10)⟶R4; 100−ATN (R11/F1R9τ2+R10τ2)) ⟶R5;9

SPC 1 ⊢
25:
6⟶A;DSP "ZERO LEFT,AIM A";STP ⊢
26:
GSB 2 ⊢
27:
9⟶A;DSP "B";STP ⊢
28:
GSB 2 ⊢
29:
12⟶A;DSP "C"; STP ⊢
30:
GSB 2 ⊢
31:
6⟶A;9+B;D⟶D;GSB 10 ⊢
67:
GSB 9 ⊢
68:
Z⟶R1;18⟶A;12⟶8;3⟶C;GSB 10 ⊢
69:
3⟶A;15⟶B;GSB 16 ⊢
70:
Y+R33⟶R0 ⊢
71:
21⟶A;6⟶B;GSB 16 ⊢
72:
Y/Z⟶X;15⟶A;6⟶B;9⟶C;GSB 11 ⊢
73:
21⟶A;9⟶B;GSB 16 ⊢
74:
Y/Z⟶Y;ATN (Y/X)⟶Z ⊢
75:
IF X>0;IF Y>0; JMP 3 ⊢
76:
IF X>0;IF Y≤0;Z+400⟶Z;JMP 2 ⊢
77:

GSB 11 ⊢
46:
R22*R17−R23*R16⟶R24;R7*R17−R8*R1
6⟶R25 ⊢
47:
R6*R17−R8*R15*R26;R21*R17−R23*R16
5⟶R27;CFG 2;R31+9⟶R31 ⊢
48:
0⟶R29;PRT "HR", "ALPHA","DEPTH","RADIUS";SPC 1;
PRT "D MM","R 111;
";SPC 2 ⊢
49:
R29+1⟶R29;IF R29>R28;GTO 601−

| R | |
|---|---:|
| | 1 |
| | 750307.1459 |
| | 4711.1234 |
| | .1 |
| | 229 |
| | .05 |
| | .25 |
| | 147 |
| | 0.000 |
| | 0.000 |
| | 35.000 |
| | 3.363 |
| | 40.141 |
| | 106.836 |
| | 3.347 |
| | 57.525 |
| | 90.463 |
| | 3.322 |
| | 57.725 |
| | 106.955 |

PROGRAM LISTING

Program with distance checking

```
            →C;GSB 9 |—              Z+200 →Z |—
57:                                 78:
Z→R36;FXD 2;DSP                     R30+Z*36/40+Z |—
R4;STP |—                           79:
58:                                 IF Z>360;Z−360÷Z           R
DSP R5;STP |—                       ;JMP 2 |—
59:                                 80:
DSP Z;STP |—                        IF 0>Z;Z+360 →Z |—         NR
60:                                 81:                        ALPHA
DSP R29;DSP ;                       FXD 0;PRT R29;             DEPTH
DSP ;DSP ;DSP ;                     FXD 1;PRT Z;FXD            RADIUS
DSP "OK ?";STP |—                   3;PRT R0,R1 |—
61:                                 82:                        D MM
                                    SPC 1;FXD 1;PRT            R MM
9 →A;GSB 2 |—
62:                                 1E3*R0/R35;1E3*R
IF R29≤R28;IF                       1/R35;FXD 3;SPC
ABS (R36−X)>.7;
                                    2 |—
DSP "BAD?GOTO 50                    83:
                                    R31+9÷R31;IF R31
";STP |—
63:                                 >50;GSB 7 |—
                                    84:
18→A;9→B;3→C;
GSB 10 |—                           GTO 49 |—
64:                                 85:
3→A;15→B;GSB 16 |—                  END |—
65:                                 R127
R18+Y*R15→R12;R1
9+Y*R16→R13;R20+
Y*R17→R14 |—
66:
12→A9→B;21→C;
GSB TE |—
```

|  |  |
|---|---|
|  | .625 |
|  |  |
|  | 2 |
|  |  |
|  | 1 |
|  | 220.8 |
|  | .070 |
|  | .198 |
|  | 2.0 |
|  | 5.6 |
|  | 2 |
|  | 221.4 |
|  | .043 |
|  | .241 |
|  | 1.2 |
|  | 6.9 |

As is seen from the program, the steps thereof are numered. In step 0, TBL 3 means that the system employs a 400° measuring unit rather than the usual 360°. This is because geodetic instruments normally use the 400°.

The following comments aid in an understanding of the above computer program:

An arrow → means "put into a memory cell" the number of which is following.

| | |
|---|---|
| R 32 | means memory cell No. 32 |
| SFG | means "set flag" |
| GSB | means "go to subroutine" |
| |— | means end of the sentence |
| FXD | means "fixed" and is followed by a number stating the number of numerals behind decimal point |
| PRT | means "print" |
| SPC | means "space", i.e. new line |
| RET | means "return" |
| DSP | means "display" on the display of the calculator (not print out) |
| STP | means "stop" |
| Flags | |
| Flag 2 | activates printing of measured point in polar coordinates |
| Jump addresses | |
| GO TO 17 | start for the calculating part |
| 19 | input of ordered point (from 22) |
| 23 | Input of reference angle and reference depth |
| 24 | measuring on the reference points ABC (from 43 manually) |
| 48 | next measuring point (from finished section 83) |
| 49 | remeasuring of ordered point (from 61 manually) |
| 59 | next not ordered point (from 48) |

The following is a memory map for the above program which is helpful in debugging the program and also in transposing the program for use on other computing devices:

| | |
|---|---|
| R 0, 1, 2 | working cells and h, r, α |
| R 3, 4, 5 | difference vectors |
| R 6, 7, 8 | A, â |
| R 9, 10, 11 | B, F |
| R 12, 13, 14 | C, G |
| R 15, 16, 17 | N, n̂ |
| R 18, 19, 20 | V₁, E |
| R 21, 22, 23 | V₂, m̂, r̂, F−G |
| R 24−27 | coefficients |
| R 28 | accumulating integer for ordered points |
| R 29 | accumulating integer for measured points |

| | |
|---|---|
| R 30 | angle from generatrix reference to reference point A |
| R 31 | accumulating integer for printed lines |
| R 32 | accumulating integer for length of printed paper |
| R 33 | depth from depth reference plane to ABC-plane |
| R 34 | — |
| R 35 | scaling factor for drawing on mm-paper |
| R 36 | calculated distance to ordered point |
| R 37, 38, 39 | cylinder coordinates for ordered point No. 1 |
| R 40, 44, 42 and so on | cylinder coordinates for ordered point No. 2 |
| R 124, 125, 126 | cylinder coordinates for ordered point No. 30 |

It should be understood that while the invention has been described with respect to a particular embodiment thereof, numerous others will become obvious to those with ordinary skill in the art in light thereof.

What is claimed is:

1. A method of making a series of measurements of the relative position of a point on the surface of an object with respect to said object; said point moving with respect to a measuring instrument between said measurements; comprising the steps of:
    a. measuring the location of first, second and third non-collinear reference points on said object with respect to said measuring instrument with said object in a first location relative to said measuring instrument;
    b. measuring the location of said point on said surface with respect to said measuring instrument with said object in said first location with respect to said measuring instrument;
    c. measuring the location of said first, second and third non-collinear reference points on said object with respect to said measuring instrument with said object in a second location with respect to said measuring instrument;
    d. calculating the location of said point on said surface with respect to said first, second and third non-collinear reference points;
    e. then calculating the location of said point on said surface with respect to said measuring instrument with said object in said second location with respect to said measuring instrument;
    f. measuring the location of said point on said surface with respect to said measuring instrument with said object in said second location with respect to said measuring instrument; and
    g. determining an estimate of wear of said surface by utilizing the calculation of step (e) and the measurement of step (f).

2. A method in accordance with claim 1 wherein said steps of measuring are accomplished by utilizing an electro-optical distance measuring instrument which provides an electrical signal indicative of distance and angular relationship of the point to be measured with respect to the instrument.

3. The method of claim 2 wherein said step utilizing electro-optical distance measuring equipment includes utilizing a laser electro-optical distance measuring instrument.

4. The method of claim 2 wherein said calculating and determining steps are accomplished by utilizing a digital computer whose input is connected to the output of said electro-optical distance measuring equipment.

5. A method of determining the wear of a surface of an object at a specified location on the surface utilizing a measuring instrument, said method comprising the steps of:
    a. measuring the location of first, second and third non-collinear reference points on said object with respect to said measuring instrument;
    b. calculating the aiming angles and distance to a point at the specified location needed for operating said instrument by utilizing the measurements of step (a) and a first wear estimate;
    c. measuring the distance to the surface at the specified location along the calculated aiming angles;
    d. determining if the measured distance equals the calculated distance;
    e. displaying said first wear estimate if the measured and calculated distances are equal as determined in step (d);
    f. calculating a new estimate of wear based upon the difference between the measured and calculated distances as determined in step (d) if said distances are not equal; and
    g. repeating the above steps beginning with step (b) utilizing said new estimate in place of said first estimate.

* * * * *

UNITED STATES PATENT OFFICE
CERTIFICATE OF CORRECTION

Patent No. 4,025,192            Dated May 24, 1977

Inventor(s) KARL RAGNAR SCHÖLDSTRÖM, et al

It is certified that error appears in the above-identified patent and that said Letters Patent are hereby corrected as shown below:

Column 2, Line 39, delete "the" and insert therefor:
-- that -- .

Program Listing (under Columns 9 and 10), Line 23, delete "COS A-R25*SIN H) and insert therefor:
-- COS A-R25*SIN A) -- .

Program Listing (under Columns 9 and 10), Line 27, delete "Z ⟶ R21;(R17*COS H" and insert therefor:
-- Z ⟶ R21;(R17*COS A -- .

Signed and Sealed this

*Thirteenth* Day of *September 1977*

[SEAL]

Attest:

RUTH C. MASON          LUTRELLE F. PARKER
*Attesting Officer*     *Acting Commissioner of Patents and Trademarks*